United States Patent [19]

Way, Jr.

[11] 4,220,133
[45] Sep. 2, 1980

[54] COOKING PAN WITH ELEVATABLE GRILL

[76] Inventor: Lee V. Way, Jr., Rte. 4, Box 185F, Sumter, S.C. 29150

[21] Appl. No.: 972,981

[22] Filed: Dec. 20, 1978

[51] Int. Cl.³ .............................................. F24C 15/16
[52] U.S. Cl. ............................ 126/337 A; 126/25 A; 126/41 E; 99/391
[58] Field of Search ............... 126/337 R, 337 A, 273, 126/25 A, 41 E, 338–340, 452; 99/390–393; 312/351; 211/207, 208, 175

[56] References Cited

U.S. PATENT DOCUMENTS

| | | | |
|---|---|---|---|
| 575,185 | 1/1897 | Weber | 126/340 |
| 1,692,630 | 11/1928 | Delaih | 126/337 A |
| 1,986,035 | 1/1935 | Wells | 126/337 A |
| 2,641,247 | 6/1953 | Genebach | 126/337 A |

Primary Examiner—James C. Yeung
Attorney, Agent, or Firm—B. B. Oliver

[57] ABSTRACT

A cooking pan supports a grill with means to control the elevation of the grill within the pan. While generally useful in cooking, the invention is especially suited to use in solar cookers.

3 Claims, 4 Drawing Figures

COOKING PAN WITH ELEVATABLE GRILL

BACKGROUND OF THE INVENTION

1. Field of the Invention

The invention relates to cooking pans having a supported grill.

2. Description of the Prior Art

Cooking ovens having means to support grills at different elevations are known. It is also known to provide cooking pans with removable grills located at a fixed elevation on the pan. Experienced cooks have, for example, often changed the elevation of a grill within an electric or gas oven during the cooking process to avoid burning, overcooking, or otherwise improve the cooking process.

In recent years there has been an increased interest in using portable solar cookers such as illustrated in applicant's prior U.S. Pat. No. 4,077,391. A unique consideration in using a solar cooker is that the amount of solar energy extracted and transferred to the oven space within the solar cooker is subject to wide variation dependent on orientation of the solar cooker, weather conditions, and the like. Generally speaking, food cooked within a solar cooker has normally been maintained at a fixed elevation within a cooking pan and with no means to vary the elevation of the food with respect to the pan and with respect to the heat generating area immediately above the pan.

The general object of the present invention is thus to provide a cooking pan of general application to the cooking art but especially suited to the needs of cooking with a solar cooker and enabling the elevation of the food to be adjusted during the process of cooking.

SUMMARY OF THE INVENTION

The invention comprises an open top cooking pan with a grill supported on adjustable, elevating means within the confines of the sidewalls of the pan. The elevating means enable the grill to be raised and lowered within the pan to accommodate to changes in heat within the oven, to better control the rate of cooking, and to avoid burning, overcooking, and the like.

DESCRIPTION OF THE PREFERRED EMBODIMENT

Figure 1:
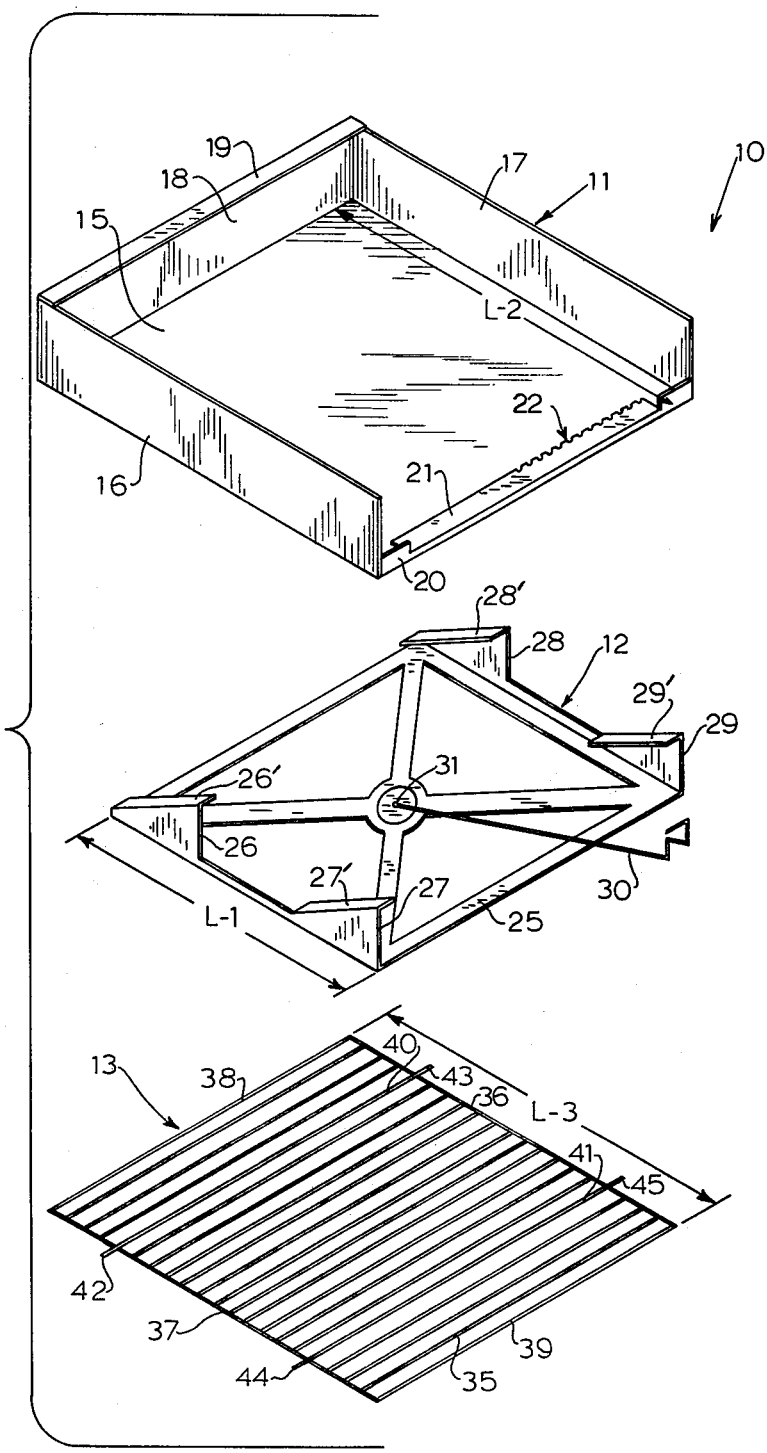
FIG. 1 is an exploded, perspective view of the cooking pan of the present invention.

The improved pan 10 of the invention comprises an open top, formed metal base pan 11; an elevating, formed metal grill support 12; and a mating metal rod grill 13.

The base pan 11 is comprised of a bottom wall 15, opposed sidewalls 16, 17, an upstanding rear wall 18 with an appended edge wall 19 to catch drippings, and the like, when pan 10 is tilted. An upstanding front wall 20 of lesser height than rear wall 18 has an inwardly turned edge wall 21 formed on its inner edge with a set of laterally-spaced notches 22.

Figure 2:
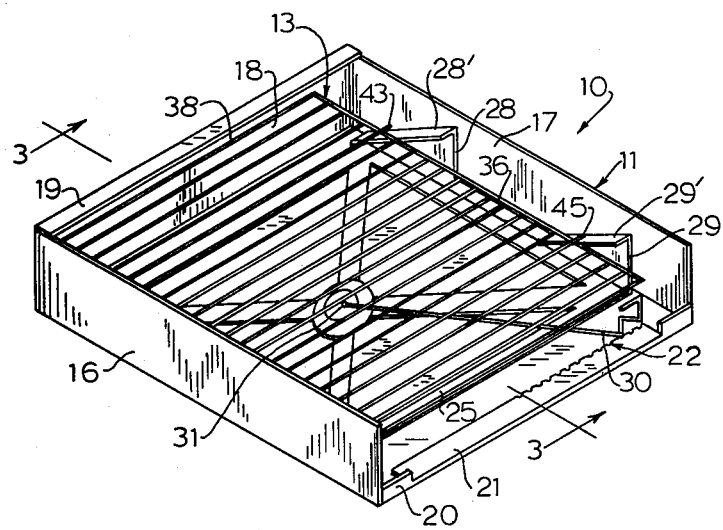
FIG. 2 is a perspective view of the assembled pan.
Figure 3:
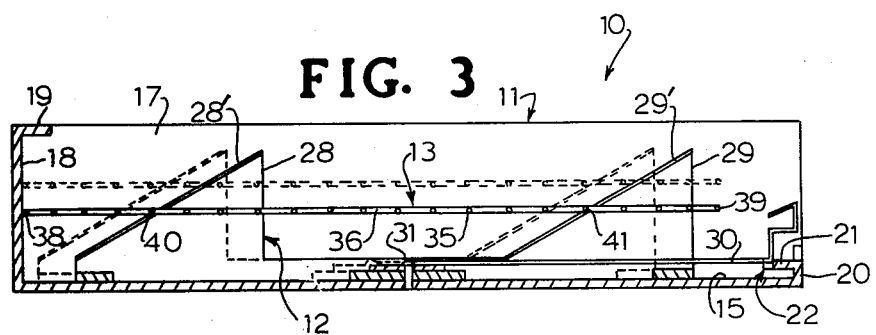
FIG. 3 is an elevational, section view taken substantially along line 3—3 of FIG. 2 and illustrating in dashed lines a second cooking position.

The elevating grill support 12 comprises a base section 25 which fits loosely within base pan 11 and provides four upstanding, appended sidewall members 26, 27, 28 and 29 with corresponding camming surfaces 26', 27', 28' and 29'. Camming surfaces 26'-29' can be seen to slope rearwardly and downwardly in the installed position depicted in FIG. 2. Also to be seen in FIG. 2 is the pivotal camming lever 30 on pivotal mount 31 and which is adapted for releasably engaging the mentioned notches 22 for raising and lowering grill 13.

Grill 13 comprises a framework of laterally extending metal rods 35 bounded by side rods 36, 37 and end rods 38, 39. Two of the rods 35 designated as rods 40, 41 can be seen as having respective lateral, spaced apart, side extensions 42, 43, 44, 45 which as illustrated in FIG. 2 are designed to engage and slide on the mentioned camming surfaces 26'-29'. The external length L-1 of grill support 13 is purposely made somewhat less than the internal length L-2 of base pan 11 to allow some degree of back and forth movement in the L-1 direction. The length L-3 of grill 13 is chosen to allow a loose fit within the confines of base pan 11 and such that end rod 38 of grill 13 may bear against rear wall 18 when grill support 13 is forced rearwardly.

Figure 4:
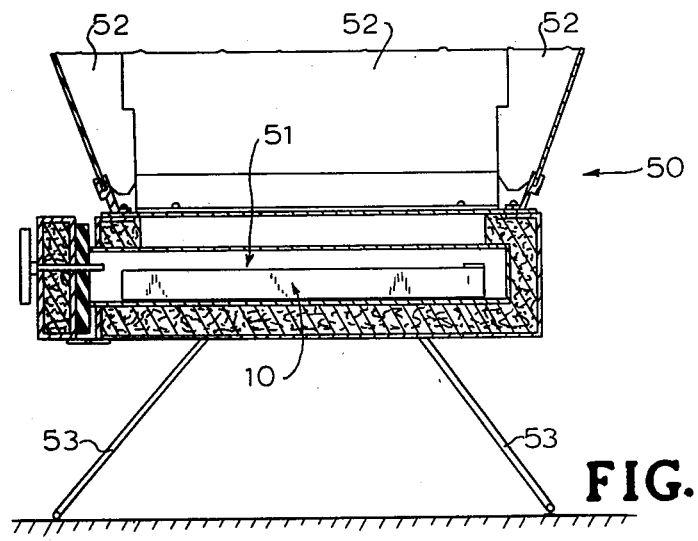
FIG. 4 is a sectional view through a prior art type solar cooker such as shown in U.S. Pat. No. 4,077,391 and illustrating use of the cooking pan of the present invention.

As illustrated in FIG. 4, the pan 10 of the invention has special application to a solar cooker 50 having an oven area 51, reflectors 52 and leg supports 53. In use, it will be seen that the elevation of grill 13 can be controlled by adjusting camming lever 30 with respect to notches 22 in base pan 11. Thus, movement from right to left of camming lever 30, as shown in the drawings, will cause grill support 12 to be forced rearwardly and grill 13 to elevate on the respective camming surfaces 26'-29' whereas movement of camming lever 30 from left to right will allow grill support 12 to move forwardly to allow grill 13 to be moved to a corresponding lowered elevation in base pan 11.

While especially useful in solar cookers, the cooking pan and grill assembly of the invention is recognized as having general application to other cooking ovens. Also, while not illustrated, it is also recognized that grill 13 could be stamped and formed of flat metal sheet with side tabs or the like for support on the described grill support.

What is claimed is:

1. A cooking pan and grill assembly comprising, in combination:
   (a) an open top rectangular metal base pan having on a frontal structural portion thereof a set of laterally spaced notches;
   (b) a rectangular metal grill mating said pan and having spaced-apart support portions extending laterally from opposed sides thereof; and
   (c) an elevating grill support mating and having a rectangular base section designed to fit loosely within said base pan, said base section having upstanding appended side structure providing a plurality of sloped camming surfaces mated to and providing support surfaces for said grill support portions and having a camming lever pivotally mounted at one end on said base section and at an opposite end adapted for manual releasable engagement with selected ones of said spaced notches of said base pan to effect linear forward and rearward movement of said grill support in said base pan to in turn effect vertical up and down movement of said grill on said grill support camming surfaces to regulate the elevation of said grill on said pan during cooking.

2. A cooking pan and grill assembly as claimed in claim 1 wherein said base pan includes on a front wall portion thereof an inwardly turned edge wall formed with said set of laterally spaced notches.

3. A cooking pan and grill assembly as claimed in claim 1 wherein said metal grill is formed of a metal rod framework including a pair of spaced-apart rods of sufficient length to provide said support portions.

* * * * *